June 10, 1958 — R. J. COVERT — 2,838,087
TUBELESS TIRE PATCH
Filed April 8, 1955 — 2 Sheets-Sheet 1

INVENTOR
Robert J. Covert
By Herbert A. Weintury
ATTORNEY

June 10, 1958  R. J. COVERT  2,838,087
TUBELESS TIRE PATCH

Filed April 8, 1955  2 Sheets-Sheet 2

INVENTOR
Robert J. Covert
By Herbert A. Minturn
ATTORNEY

United States Patent Office 2,838,087
Patented June 10, 1958

2,838,087

TUBELESS TIRE PATCH

Robert J. Covert, Indianapolis, Ind., assignor to Bowes "Seal Fast" Corporation, Indianapolis, Ind., a corporation of Indiana Application April 8, 1955, Serial No. 500,212

1 Claim. (Cl. 152—367)

This invention relates to a tire patch which is so constructed as to be more readily bendable on chordal lines adjacent the perimeter of the patch as compared to like located chordal lines at right angles to the first lines.

To repair a puncture in a tubeless tire presents a different problem than that encountered in repairing an inner tube within a casing or repairing the casing itself carrying an inner tube. When the inner tube is employed, the patch will be between the tube and the casing regardless of whether the leak is through the casing or through the tube, and under the flexing of the casing and tube, the patch is always tended to be compressed into position between the tube and the casing. In tubeless tire, there is no inner tube present to exert pressure on a patch which is initially caused to adhere to the inner face of the tire over the break or puncture. Also when the puncture is in the zone between the side wall and the edge of the tread of the tire, there is an extreme condition of flexing encountered tending to either work the patch loose or break it on a chordal or diametrical line depending upon the location of the patch within the tire. The same tendency to break the patch is exerted in a more or less degree when the patch is applied over the tread or over the side walls removed from that zone. Particularly is this true should the tire be slightly under-inflated permitting the tread to bend inwardly between its outer circumferential edges and also permitting the walls to bend as the tire is revolved in service.

The present invention provides a structure which overcomes this tendency for the patches to break or work loose in a very simple and yet most successful manner. It has been discovered that when a patch is built up to have one or more layers of fabric embedded in the rubber of the patch, the patch under repeated flexing tends to break across the ends of the fabric. To overcome this tendency, the present invention was evolved.

The invention is described in the one particular form illustrated in the accompanying drawings, in which Fig. 1 is a top plan view in partial section of a patch built in accordance with the invention;

Figure 3:
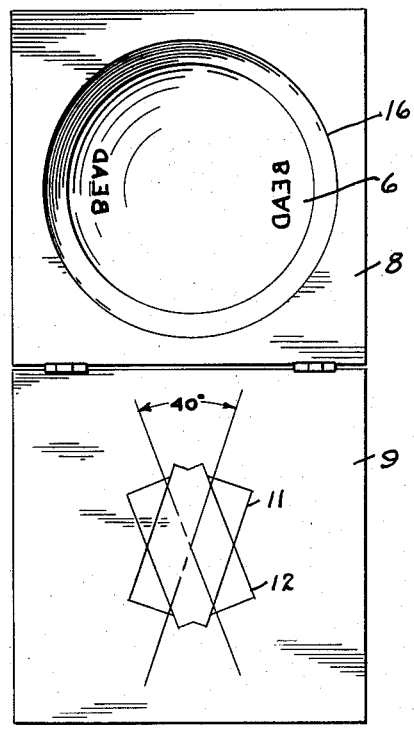
Fig. 3 is a view in top plan of an opened single cavity mold in which the patch is formed.
Figure 4:
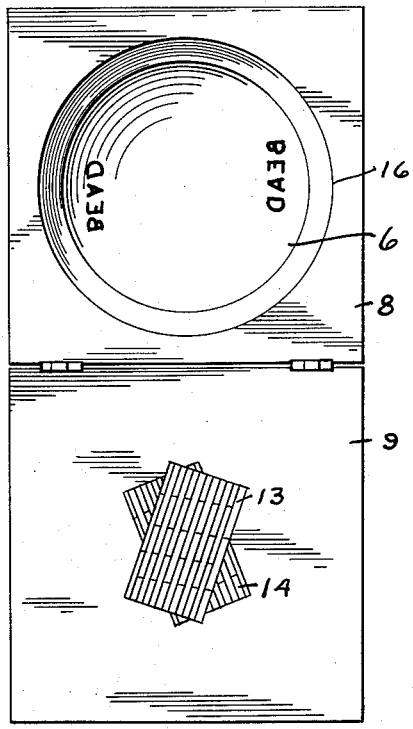
Fig. 4 is a view in top plan of the same mold with fabric positioned therein.

The invention will be better understood by describing its process of being made in reference to the molds. Referring to Fig. 3, a single cavity book type mold (multiple molds will be used in production) is shown to have a mold cavity 6 in the top portion 8, and a flat faced base plate 9 hinged to the portion 8, and on which there are provided outlines of rectangles 11 and 12. The center lines of these two rectangles will be located at an approximate angle of 40 degrees therebetween.

Two equal rectangular lengths 13 and 14 of rubberized synthetic fabric or threads such as nylon, preferably cross-stitched, are laid on the base plate 9 of the mold to have their outlines coincide substantially with the lines of the rectangles 11 and 12. These rectangular designations 11 and 12 on the plate 9 are employed simply as means for initially positioning the fabric lengths 13 and 14 to insure them being centered and placed at substantially the correct angles.

Figure 5:
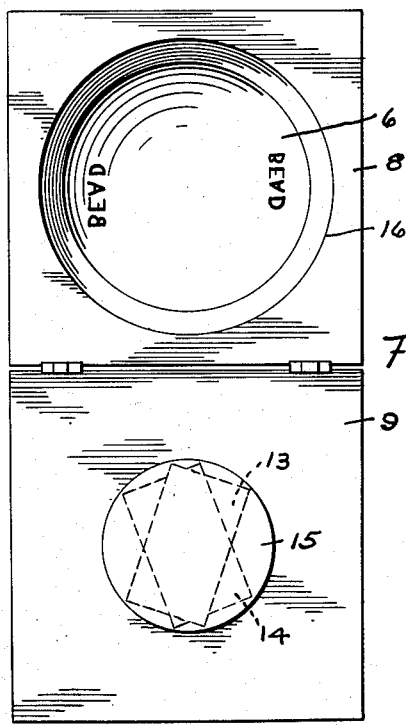
Fig. 5 is a view showing the rubber laid over the fabric in its proper relationship therebetween and to the mold prior to closing and applicaton of heat.

Next a circular disc 15 of tube gum having a diameter slightly exceeding the over-all dimensions of the laid up fabrics 13 and 14 is positioned centrally over those fabrics as indicated in Fig. 5. The mold is closed to apply heat and pressure on the disc 15 causing it to flow out uniformly to the boundary 16 of the cavity 6. In so doing, the fabrics 13 and 14 are tended to be placed under both lateral and longitudinal tension so that the central zone of the finished patch at least will tend to remain in usage in a substantially unstretchable condition. In this respect, the method of stretching the fabrics is followed in accordance with the teachings in the patent to Mullen, No. 2,157,183.

The patch so far produced is indicated in reference to Fig. 5 is then removed and placed over a thin sheet of raw material normally called face gum 17 having an under protective coating of a removable sheet of material 28 such as metallic foil, holland cloth, or some synthetic plastic. This layer of face gum will cure under the application of heat and become an integral part of the completed patch. The fabrics 13 and 14 are thus completely embedded in and covered over by the body of rubber 15, and immediately above the face gum applied to the normally underside of the patch. This completes the formation of the patch generally identified by the numeral 18, Fig. 1.

While the invention has thus far been described in reference to two layers of fabric 13 and 14, the invention is not to be limited to that number since additional layers of fabric may be employed, particularly on large patches. However, it is critical that these patches should be so angularly laid over one another as to provide, such as is shown in the simple form, Fig. 1, single thickness of corners 19, four in the present instance extending out into the rubber from opposite sides of a center line AB, wherein, in reference to this line, the overlying fabrics 13 and 14 present double thicknesses along the line AB almost entirely to their outer ends.

By this arrangement, the completed patch will bend more readily along lines CD and EF than it will on the line AB, or even on transverse lines GH and JK. This is due to the fact that on the lines GH and JK, two layers of fabric resist that bending whereas on the lines CD and EF, there are but single layers of the fabric distributed therealong in the bending.

This means that the patch, being more readily bendable on the lines CD and EF will not break as readily under continued flexing on those lines as it would on the lines GH and JK which extend substantially transversely across the patches through double thicknesses thereof whereas the other lines CD and EF extend somewhat longitudinally of the corners and at least do not enter back into the double or multiple thickness of fabric.

The patch carries outward notations in reference to the lines CD and EF such as by the word "Bead" so that the patch may be mounted in the tire 20 accordingly to take advantage of this peculiar construction of the patch. These two more flexible sides of the patch 18 are identified herein by the numerals 21 and 22. Following good and well known practice in the art, the patch 18 is molded to have an outer peripheral portion 23 feathering out from the central thicker zone of the patch to an extremely thin, knife-like edge.

Figure 1:
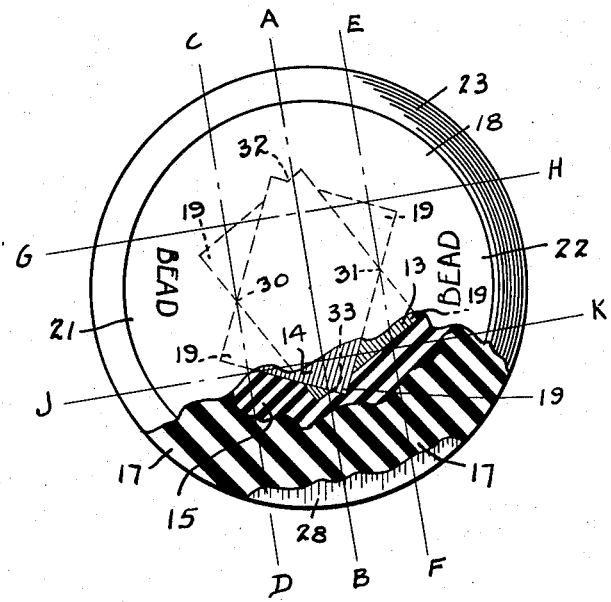
Figure 2:
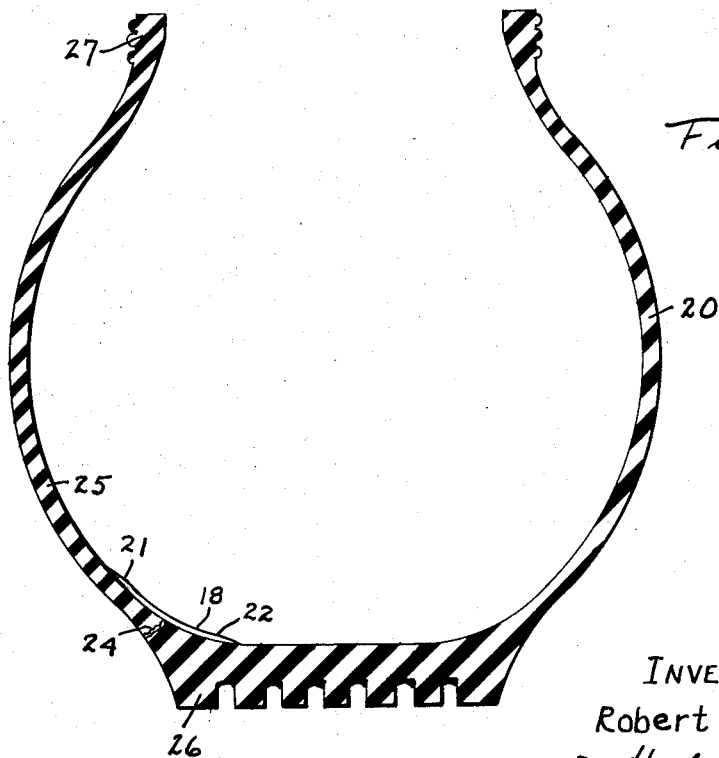
Fig. 2 is a detail in cross-section through a tubeless tire showing a patch embodying the invention in position.

As indicated in Fig. 1, there is a considerable extent of rubber not only extending radially past the side edges of the overlaid fabrics 13 and 14, but also radially beyond the fabric ends, that is the ends of the strings or cords of which the fabric is made, although this rubber extent beyond the ends is of lesser degree than that beyond the sides. It has been discovered that, if the fabrics 13 and 14 are extended appreciably longitudinally beyond the positions relative to the periphery of the patch 18 as shown in Fig. 1, and yet are embedded in the rubber, the patch will break across those ends, and even break somewhat back of those ends in many cases. The breakage does not occur when the fabrics are relatively shortened whereby the fabric pile is limited in extent entirely therearound to a concentrated area centrally of the patch.

In Fig. 1, the fabric side intersections 30 and 31 are approximately one and one-eighth inches from the peripheral feathered edge of the patch 18, whereas the end intersections 32 and 33 are approximately seven-eighths of an inch from that periphery, the over-all diameter of the patch being approximately three and three-eighths inches for this one particular size. These sets of dimensions are merely to illustrate the proportions rather than to serve as limitations. The important factor is that there be this rubber area beyond the fabric ends as well as beyond the sides. The patch 18 still preserves, in this respect, the greater flexibility along the lines CD and EF than along the lines GH and JK.

As to the use of the term "rubber" herein, including the claim, "rubber" is intended to include both the natural rubber as well as the various synthetic forms and rubber mixtures therewith, vulcanizable in both hot and cold processes to the inner wall of the tire.

Assuming that the tire 20 has a puncture 24 located in the zone between the side wall 25 and the tread 26, a patch 18 is placed centrally thereover to have the sides 21 and 22 overlapping the area immediately around the puncture 24 whereby the side 21 will extend upwardly on the wall 25 toward the bead 27 of the tire and the other side portion 22 of the patch 18 will be carried around and over the tread 26 so that the more bendable portions of the patch are located to conform to the areas of greatest flexing of the tire 20. The central zone of the overlapping fabrics 13 and 14 is to be centered over the puncture 24. The patch 18 is thus more rigid circumferentially of the tire than it is laterally therearound.

In reference to the lines CD, EF, GH, and JK, these lines are taken to be normal to equal lengths of radii from the center of the patch in order to explain the difference in flexibility in the different zones of the patch. Normally of course, the protective layer 28 on the face gum will be removed at the time the patch 18 is to be applied to the tire all in the usual and well known manner.

Thus with a patch of the construction described, the puncture 24 will be substantially permanently repaired by the overlying patch 18 which will tend to remain in place even in the absence of any tube on the inside of the tire 20 pressing thereagainst. The face gum of the patch will vulcanize itself to the inner side of the tire 20.

Therefore while I have described my invention in the one particular form, it is obvious that structural changes may be employed, such as has been suggested in reference to the number of plies of fabric to be employed in regard to the particular sizes of the patch, all without departing from the spirit of the invention, and I therefore do not desire to be limited to that precise form beyond the limitations which may be imposed by the following claim.

I claim:

A tubeless tire patch constructed for predetermined direction positioning relative to beads of the tire, comprising a pair of rectangular equal lengths of fabric symmetrically, diagonally laid one length over the other, embedded in rubber, and crossing one another at an angle greater than ninety degrees measured along side edges thereof; said diagonally laid lengths defining non-overlapping major area triangular corner portions, the apices of which are right angles and are pointed oppositely toward the tire beads; said diagonally laid lengths also defining non-overlapping minor area triangular corner portions, the apices of which are right angles and are closer together than said first apices and point in directions normal to those of the major triangular portions; said lengths having an extent of overlapping exceeding the longitudinal lengths thereof in a direction parallel to said beads exceeding the maximum extent of overlapping in a direction normal to said beads.

References Cited in the file of this patent

UNITED STATES PATENTS

| | | |
|---|---|---|
| 1,648,729 | Hawkinson | Nov. 8, 1927 |
| 2,157,183 | Mullen | May 9, 1939 |
| 2,587,759 | Pierce et al. | Mar. 4, 1952 |